United States Patent [19]

Judd

[11] Patent Number: 4,789,555
[45] Date of Patent: Dec. 6, 1988

[54] APPARATUS AND METHOD FOR PREPARING PATTERNED BAKED GOODS

[75] Inventor: Virginia L. Judd, Glendale Heights, Ill.

[73] Assignee: Griffith Laboratories U.S.A., Inc., Alsip, Ill.

[21] Appl. No.: 46,660

[22] Filed: May 6, 1987

[51] Int. Cl.$^4$ ............................ A21C 5/00; B26B 3/00
[52] U.S. Cl. ...................................... 426/503; 30/301; 30/316; 425/289; 425/298; 426/512; 426/523
[58] Field of Search ............... 426/503, 523, 512, 518; 30/301, 305, 316; 425/289, 298, 385

[56] References Cited

U.S. PATENT DOCUMENTS

| | | | |
|---|---|---|---|
| 2,214,475 | 9/1940 | Napolillo | 30/316 |
| 2,612,123 | 9/1952 | Nord | 425/298 |
| 4,424,601 | 1/1984 | Weber | 30/302 |

OTHER PUBLICATIONS

Williams–Sonoma Catalog, May 1987, at pp. 48–49, item D ("Vienna Glass Cookie Stamp").

Primary Examiner—George Yeung
Attorney, Agent, or Firm—Hosier & Sufrin, Ltd.

[57] ABSTRACT

An apparatus and a method for preparing a patterned baked good by cutting a dough piece and impressing a pattern on the dough piece.

15 Claims, 1 Drawing Sheet

APPARATUS AND METHOD FOR PREPARING PATTERNED BAKED GOODS

BACKGROUND OF THE INVENTION

This invention relates generally to baked goods and, more particularly, to an apparatus and a method for preparing patterned baked goods from sheeted dough.

Patterned baked goods, such as jelly rolls, are enjoyed by consumers both for their visual appearance and for their textural feel. Jelly rolls and other baked goods of this type have been made in the past by rolling out dough, coating the dough with jelly, sugar, cinnamon or other condiments, rolling up the coated dough, slicing it into a series of disks or "rolls", and baking. Unfortunately, this labor-intensive process makes the preparation of such baked goods both time-consuming and expensive.

It is therefore an object of the present invention to provide patterned baked goods, including baked goods with a spiral texture suggestive of jelly-roll-type baked goods without conventional rolling and cutting operations.

These and other objects of the present invention will become apparent to those skilled in the art upon consideration of the accompanying specification, claims and drawings.

SUMMARY OF THE INVENTION

The present invention comprises an apparatus and an method for preparing patterned baked goods. The apparatus comprises means for cutting a dough piece and means for impressing a pattern on the dough piece, whereby, upon baking, the dough piece becomes a patterned baked good.

The cutting means of the apparatus is a generally upstanding collar having a continuous leading edge which is pressed into dough to cut out dough pieces.

In one preferred embodiment, the cutting edge of the apparatus is chamfered to form a knife edge which facilitates the cutting procedure. The dough into which the apparatus is pressed is preferably sheeted although individual dough portions which are pulled away from a dough mass and cut without rolling may be used.

The impressing means is a pattern member having a second leading edge. The second leading edge preferably is set back from the continuous first leading edge of the upstanding collar. This setback of the leading edge of the pattern member permits the pattern member to cut a pattern into the dough without passing through the dough when the dough piece is cut, which eases release of the dough piece from the apparatus.

The pattern member may be shaped in any desired fashion, so long as it is circumscribed by the continuous collar of the apparatus. A spiral shape is preferred when it is desired to produce baked goods with a visual appearance like that of a jelly roll. The pattern member may be continuous or enclosed (eg. a circle) or it may be open or discontinuous (eg. a spiral), although when a continuous pattern member is used it should be set back as described above in order to maintain the integrity of the dough piece.

It is preferred that the leading edge of the impressing member be blunt rather than chamfered to maximize the disruption at the surface of the dough piece and to leave a wide impression in the dough piece. The second leading edge may, however, be chamfered, if desired.

The method of the present invention entails preparing a dough mass, optionally forming a sheeted dough, cutting a dough piece from the dough, impressing a pattern on the dough piece and baking the impressed dough piece to form a patterned baked good. In a preferred embodiment, the pattern is impressed on the dough piece simultaneously with the cutting of the dough piece from the sheeted dough. Also, in another preferred embodiment, the pattern cut into the dough is spiral in shape. This spiral shape, it has been found, enhances the doming of the dough piece during baking giving it a more jelly-roll-like appearance.

BRIEF DESCRIPTION OF THE DRAWINGS

The features of this invention which are believed to be novel are set forth with particularity in the appended claims. The invention, together with its objects and advantages, may be best understood by reference to the following description taken in conjunction with the accompanying drawings in which like reference numerals identify like elements in the several figures and in which:

DESCRIPTION OF THE PREFERRED EMBODIMENTS

Figure 1:
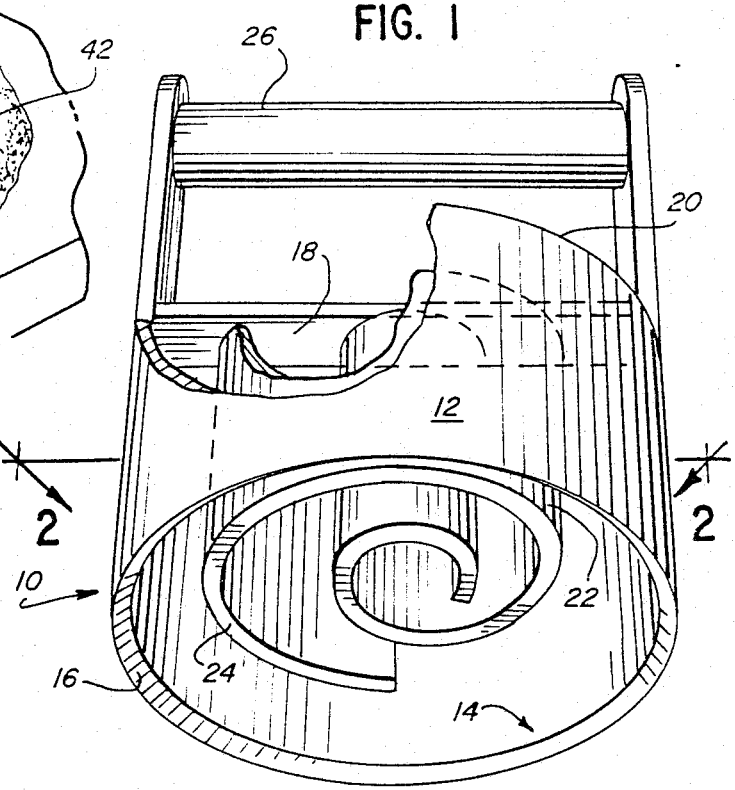
FIG. 1 is a perspective view of an apparatus in accordance with the present invention.

Turning now to FIG. 1, there is depicted a cutter 10 in accordance with the teaching of the present invention. Cutter 10 includes an outer upstanding circular collar 12 having a continuous leading planar edge 14 which is beveled to produce a knife edge 16. A back-up bar 18 is affixed across the diameter of rear edge 20 of collar 12. Attached thereto is a spiral pattern member 22 having a continuous planar leading edge 24 which is set back from leading edge 14. A handle 26 is also affixed to the back-up bar for convenience in using the cutter.

In the practice of the method of the present invention, a dough is prepared formed into a sheet 28 (FIG. 2) on a rolling board or other surface to a thickness greater than the distance SB that leading edge 22 is set back from edge 14. Any conventional dough can be used. Also, although less preferred, individual dough portions which are pulled away from a dough mass and not rolled into a sheet may be used, although such dough portions should be thick enough to permit member 22 to penetrate the dough surface, as described below.

Figure 2:
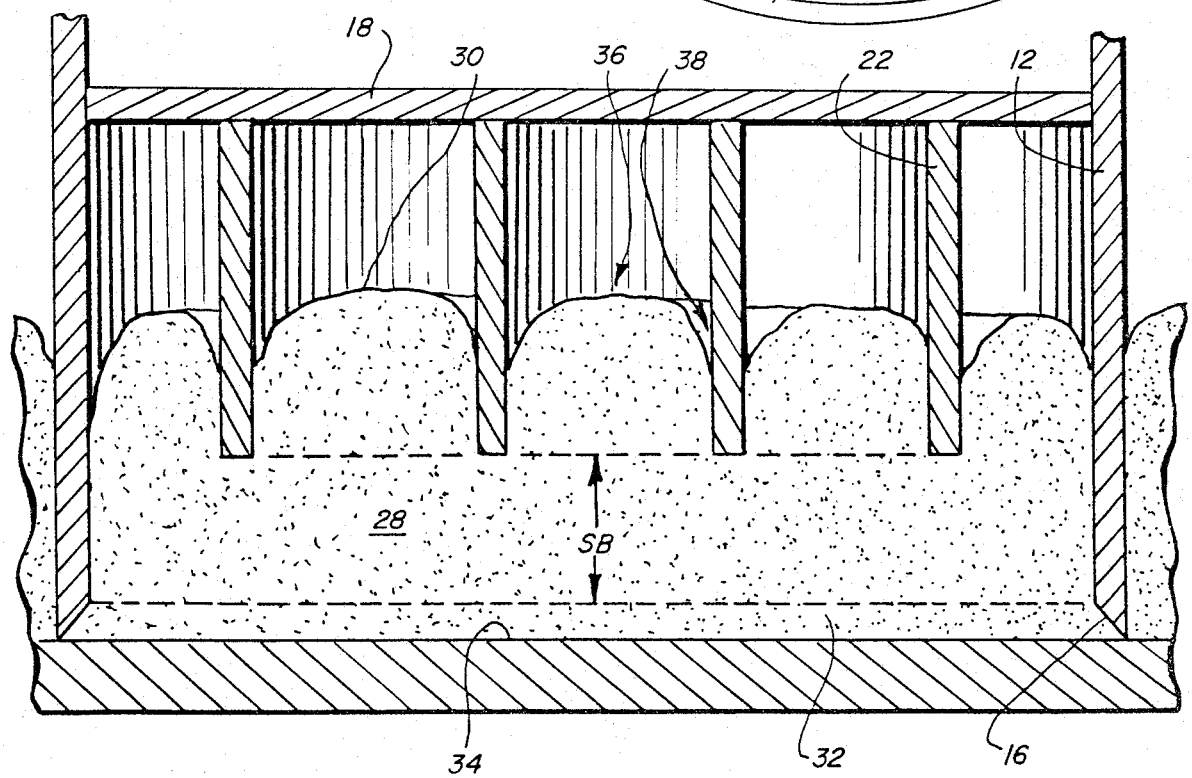
FIG. 2 is a cross-sectional view of the apparatus of FIG. 1 taken along line 2—2, showing the apparatus resting in a portion of sheeted dough after cutting and impressing the dough in accordance with the present invention; and, FIG. 3 is a perspective view of a baked good prepared using the apparatus and method of the present invention.

Cutter 10 is pressed into the dough, as shown in FIG. 2, until the knife edge 16 of cutter 12 penetrates through the surface 30 of the dough 32 to meet the rolling board face 34 upon which the dough rests thereby cutting a dough piece 32 therefrom. As the collar 12 of the cutter penetrates the dough, member 22 disrupts the surface of the dough piece forming a spiral of rounded peaks 36 between the opposing walls of member 22 and spiral valleys or indentations 38 at the point where member 22 penetrates the dough. The valleys bottom out a distance SB from rolling board face 34. In addition, as the cutter is removed from the dough piece, it draws up and stretches the dough particularly at the center of the spiral enhancing the peaking of the resulting baked good at its center.

Although it is desirable that the leading edge of the impressing member be squared off in order to produce wide, well-defined indentations 38 in the dough surface 30, the leading edge may be chamfered to produce a narrower leading edge, and may as well be chamfered to the point of producing a knife edge to facilitate the entry of the pattern member into the dough. When the cutter is removed from the dough, a free-standing dough piece remains with the desired pattern of the pattern member 22 impressed into its top surface.

The textured dough piece produced as described above, is baked in a conventional fashion, to produce a baked good. Increased browning typically occurs at indentations 38 due to enhanced heat penetration. When a spiral pattern member is used, the baked good rises along the spiral to produce the "domed" product 40 depicted in FIG. 3, having a browned spiral groove 42 corresponding to spiral groove 38 in the raw dough piece. Other pattern member configurations will produce different shapes in the final baked good.

To illustrate the invention, the following example is presented.

EXAMPLE

A cutter, as depicted in FIG. 1, is prepared with a collar having a 3½ inch diameter circumscribing a spiral pattern member having a leading edge set back about ⅜ inch from the leading edge of the collar.

A conventional biscuit mix is prepared, and cinnamon-sugar flakes and pecans are added. The dough is placed on a floured section of a baker's board, lightly floured, and formed into a rectangle by lightly patting the sides and top of the dough mass. A rolling pin is then lightly floured and the dough is rolled out to a generally uniform thickness of about ¾ inch.

Figure 3:
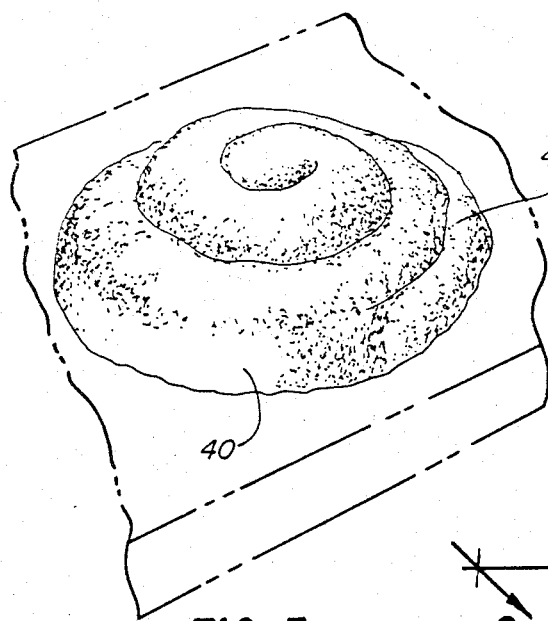

The cutter is floured and dough pieces are cut from the sheeted dough and placed onto a greased baking pan. The baking pan is placed in an oven preheated to about 375° F. and the dough pieces are baked until done. A butter-flavored oil is liberally applied to the baked rolls. The resulting product, as depicted in FIG. 3, has a visual appearance and texture suggestive of jelly-roll-type baked goods.

While the present invention is described above in connection with specific embodiments, the invention is intended to cover all alternatives, modifications or equivalents that may be uncluded within its sphere and scope, as defined by the appended claims.

What is claimed is:

1. An apparatus for preparing a patterned baked good from dough comprising:
   means for cutting a dough piece from the dough; and
   means, affixed to said cutting means, for impressing a spiral pattern on the dough piece, said impressing means comprising a pattern member having a leading edge set back from said cutting means such that when said cutting means is used to cut a dough piece, said impressing means will cut a spiral pattern into but not through the dough piece; whereby, upon baking, the dough piece becomes a patterned baked good.

2. The apparatus of claim 1 wherein said cutting means comprises a generally upstanding collar having a continuous leading edge.

3. The apparatus of claim 2 wherein said leading edge lies in a plane.

4. The apparatus of claim 2, wherein said continuous leading edge is chamfered to form a knife edge.

5. The apparatus of claim 1 including a handle affixed to said cutting means.

6. The apparatus of claim 1 wherein said pattern member is continuous.

7. The apparatus of claim 1 wherein the leading edge of said pattern member is blunt.

8. The apparatus of claim 1 wherein said pattern member is chamfered to form a knife edge.

9. An apparatus for preparing a patterned baked good from sheeted dough comprising:
   a generally upstanding collar having a continuous first leading edge for cutting a dough piece from sheeted dough; and
   a pattern member, affixed to said cutting means having a second leading edge, said second leading edge being a continuous spiral circumscribed by and set back from said first leading edge, for cutting a spiral pattern into but not through the sheeted dough when said apparatus is used to cut a dough piece from the sheeted dough; whereby, upon baking, the dough piece becomes a patterned baked good.

10. A method for preparing a patterned baked good from sheeted dough comprising:
    preparing a dough mass and forming a sheeted dough therefrom;
    cutting a dough piece from said sheeted dough and impressing a spiral pattern through the surface of said dough piece; and
    baking said impressed dough piece to form a spiral domed patterned baked good.

11. The method of claim 10 wherein said cutting and said impressing steps are performed simultaneously.

12. The method of claim 10, wherein said pattern impressed through the surface of the sheeted dough does not pass therethrough.

13. A method for preparing a patterned baked good from a dough portion pulled away from a dough mass comprising
    preparing a dough mass and pulling away a dough portion therefrom;
    cutting a dough piece from said dough portion and impressing a spiral pattern through the surface of said dough piece; and
    baking said impressed dough piece to form a spiral domed patterned baked good.

14. The method of claim 13 wherein said cutting and said impressing steps are performed simultaneously.

15. The method of claim 13, wherein said pattern impressed through the surface of the sheeted dough does not pass therethrough.

* * * * *